(12) United States Patent
Rubanovich et al.

(10) Patent No.: US 8,400,405 B2
(45) Date of Patent: Mar. 19, 2013

(54) HANDHELD ELECTRONIC DEVICE AND ASSOCIATED METHOD ENABLING TEXT INPUT IN A LANGUAGE EMPLOYING NON-ROMAN CHARACTERS

(75) Inventors: Dan Rubanovich, Waterloo (CA); Vadim Fux, Waterloo (CA); Aleksej Trefilov, Waterloo (CA); Parul Nanda, Gurgaon (IN); Timothy Koo, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 798 days.

(21) Appl. No.: 12/391,571

(22) Filed: Feb. 24, 2009

(65) Prior Publication Data
US 2009/0278804 A1 Nov. 12, 2009

Related U.S. Application Data

(60) Provisional application No. 61/051,835, filed on May 9, 2008.

(51) Int. Cl.
*G06F 3/02* (2006.01)
(52) U.S. Cl. ............................ 345/171; 345/169; 341/28
(58) Field of Classification Search .................. 345/168, 345/171, 172, 169
See application file for complete search history.

(56) References Cited

U.S. PATENT DOCUMENTS

| | | | | |
|---|---|---|---|---|
| 5,963,671 | A | * | 10/1999 | Comerford et al. ........... 382/230 |
| 6,054,941 | A | * | 4/2000 | Chen ............................... 341/28 |
| 6,847,311 | B2 | | 1/2005 | Li |
| 2006/0282791 | A1 | * | 12/2006 | Bogomolov et al. ......... 715/773 |
| 2007/0060176 | A1 | * | 3/2007 | Sloo ............................... 455/466 |
| 2008/0062136 | A1 | * | 3/2008 | Nakamura et al. ............ 345/171 |

OTHER PUBLICATIONS

ThaiKey :: Thai Keyboard for iPhone screenshot images, Retrieved from http://www.download.com/3004-13592_4-10756938.html on Dec. 9, 2008.
Thaipulse! Blog, "Motorola 'Moto Q GSM', a QWERTY Mobile", Oct. 9, 2008, Retrieved from http://www.thaipulse.com/blog/technology/motorola-moto-q-gsm-qwerty-mobile/ on Dec. 9, 2008.
Thaipulse!, "Nokia e70 Mobile phone", Retrieved from http://www.thaipulse.com/nokia-e70/ on Dec. 9, 2008.

* cited by examiner

*Primary Examiner* — Adam R Giesy
(74) *Attorney, Agent, or Firm* — Finnegan, Henderson, Farabow, Garrett & Dunner, LLP

(57) ABSTRACT

A handheld device includes a plurality of input members, a first set of which each have a Roman character assigned thereto, a least some of which have a first non-Roman and a second non-Roman character assigned thereto. In response to an actuation of a first one of the input members, a first one of the non-Roman characters that is assigned to the first one of the input members is displayed. Based on one or more rules which govern permissible character sequences in the subject language, the display of a second one of the non-Roman characters in response to an actuation of a second one of the input members having the second one of the non-Roman characters assigned thereto immediately following the actuation of said first one of the input members is prevented.

11 Claims, 9 Drawing Sheets

__US 8,400,405 B2__

HANDHELD ELECTRONIC DEVICE AND ASSOCIATED METHOD ENABLING TEXT INPUT IN A LANGUAGE EMPLOYING NON-ROMAN CHARACTERS

CROSS-REFERENCED TO RELATED APPLICATION

The present application claims the benefit of U.S. Provisional Patent Application Ser. No. 61/051,835, entitled "HANDHELD ELECTRONIC DEVICE AND ASSOCIATED METHOD ENABLING TEXT INPUT IN A LANGUAGE EMPLOYING NON-ROMAN CHARACTERS" filed May 9, 2008, the disclosure of which is incorporated herein by reference.

BACKGROUND

1. Field

The disclosed and claimed concept relates generally to handheld electronic devices and, more particularly, to a handheld electronic device and method that enable the input of text in a language, such as the Thai language, that employs characters other than Roman characters.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Such handheld devices are often used by people that speak multiple languages. Many languages, including the English language, use Roman characters (sometimes also referred to as Latin characters), and thus when a user wishes to input text into a handheld electronic device in such a language, a keyboard including Roman characters, such as a standard QWERTY keyboard, provided as part of the device may be used. However, some languages employ, either partially or entirely, a set of non-Roman characters. One such language is the Thai language. In particular, the Thai alphabet employs 71 non-Roman characters including consonants, vowels, tones and diacritics. It would be desirable for a keyboard on a handheld electronic device to provide the ability to enter text using these 71 characters. However, a typical QWERTY keyboard employed on a handheld electronic device has 28 character keys corresponding to the Roman characters. Therefore, a regular QWERTY keyboard cannot accommodate all 71 characters used in Thai script. It thus would be desirable to provide an improved method and handheld electronic device that facilitate the input of text in a language, such as the Thai language, that employs characters other than Roman characters.

BRIEF DESCRIPTION OF THE DRAWINGS

A full understanding of the disclosed and claimed concept can be gained from the following Description when read in conjunction with the accompanying drawings in which:

Similar numerals refer to similar parts throughout the specification.

DESCRIPTION

Figure 1:
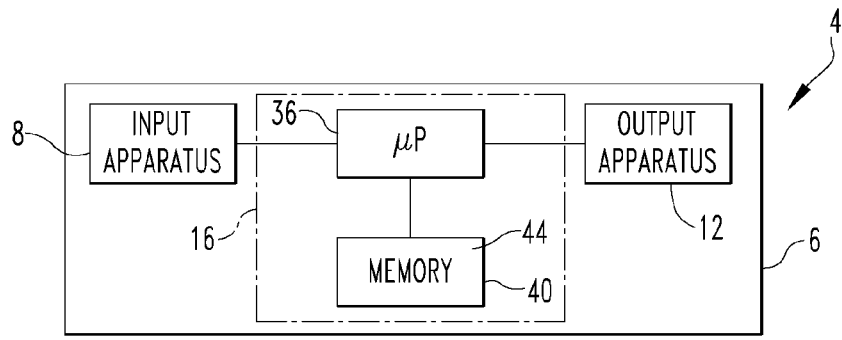
FIG. 1 is a schematic representation of an improved handheld electronic device according to an embodiment of the disclosed and claimed concept.

An improved handheld electronic device 4 is depicted schematically in FIG. 1. The exemplary handheld electronic device 4 includes a housing (not shown), an input apparatus 8, an output apparatus 12, and a processor apparatus 16. The input apparatus 8 is structured to provide input to the processor apparatus 16, and the output apparatus 12 is structured to receive output signals from the processor apparatus 16. The output apparatus 12 comprises a display, such as an LCD or a touchscreen, that is structured to provide visual output, although other output devices such as speakers, LEDs, tactile output devices, and so forth can be additionally or alternatively used.

As can be seen in FIG. 1, the processor apparatus 16 comprises a processor 36 and a memory 40. The processor 36 may be, for instance and without limitation, a microprocessor (µP) that is responsive to inputs from the input apparatus 8 and that provides output signals to the output apparatus 12. The processor 36 interfaces with the memory 40.

The memory 40 can be said to constitute a machine-readable medium and can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 40 has stored therein a number of routines 44 which are executable on the processor 36. As employed herein, the expression "a number of" and variations thereof shall refer broadly to any non-zero quantity, including a quantity of one. The routines 44 can be in any of a variety of forms such as, without limitation, software, firmware, and the like. As will be explained in greater detail below, the routines 44 include one or more routines that implement a method of facilitating the input of text into the handheld electronic device 4 in a language, such as the Thai language, that employs characters other than Roman characters, as well as other routines. It is noted that the Thai language is used as an exemplary language herein, and it is further understood that other languages that employ characters other than Roman characters, such as, without limitation, Chinese, Japanese and Korean, for example, could similarly be input on the handheld electronic device 4 using the method described herein without departing from the present concept. That is, the handheld electronic device 4 is described herein in an exemplary fashion as being configured for the inputting of Thai script, and it is understood that in other embodiments the handheld electronic device could be configured to input, for instance, Chinese, Japanese or Korean text or text in another language employing non-Roman characters without departing from the present concept.

Figure 2:
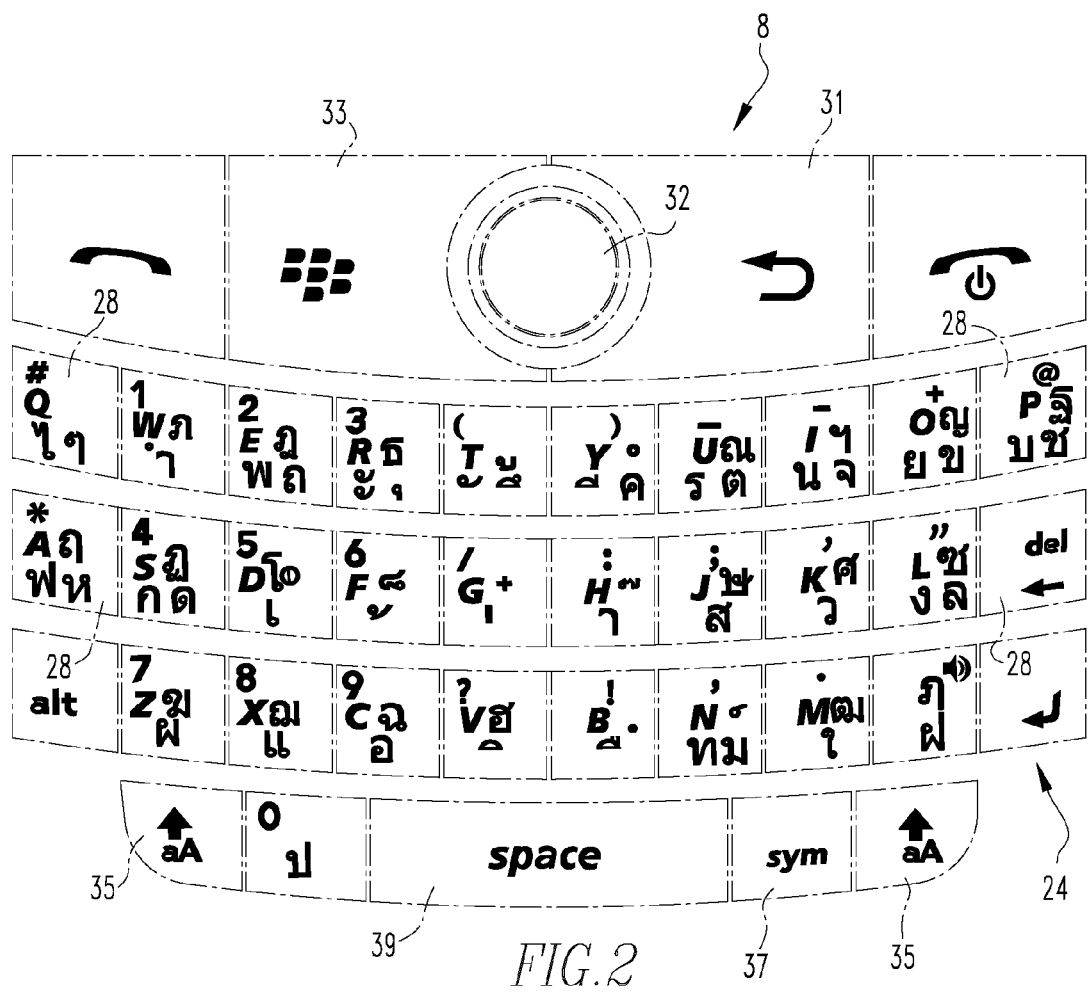
FIG. 2 is a schematic representation of an embodiment of a keyboard forming a part of the exemplary handheld electronic device shown in FIG. 1.

The input apparatus 8 is shown schematically in FIG. 2 and includes a keyboard 24 and a multiple-axis input device which, in the exemplary embodiment depicted herein, is a track ball 32 that will be described in greater detail below. The keyboard 24 comprises a plurality of keys 28 arranged in the exemplary form of a QWERTY keyboard, meaning that at least some of the keys 28 each have a plurality of linguistic elements assigned thereto, with at least some of the linguistic elements being Roman characters arranged generally in a QWERTY configuration and some of the linguistic elements being Thai characters. In particular, as seen in FIG. 2, each key 28 having a Roman character thereon also has up to three Thai characters also provided thereon. Up to two characters may be provided below the Roman character on the key 28, and one Thai character may be provided adjacent to the Roman character on the key 28. The keys 28 or the track ball 32 serve as input members that are actuatable to provide input to the processor apparatus 16. The particular operation of the keyboard 24 to facilitate the input of text in the Thai language according to the disclosed and claimed concept is described in greater detail below. The keyboard 24 and the track ball 32 are advantageously disposed adjacent one another on a front face of the housing of the handheld electronic device 4. This enables a user to operate the track ball 32 substantially without moving the user's hands away from the keyboard 24 during a text entry operation or other operation.

One of the keys 28 is an <ESCAPE> key 31 which, when actuated, provides to the processor apparatus 16 an input that undoes the action which resulted from the immediately preceding input and/or moves the user to a logically higher position within a logical menu tree managed by a graphical user interface (GUI) routine 44. The <ESCAPE> key 31 is advantageously disposed adjacent the track ball 32 thereby enabling, for example, an unintended or incorrect input from the track ball 32 to be quickly undone, i.e., reversed, by an actuation of the adjacent <ESCAPE> key 31. Another of the keys 28 is a <MENU> key 33 which, when actuated, provides to the processor apparatus 16 an input that causes the GUI 44 to generate and output on the output apparatus 12 a menu for selecting operations and operational modes of the handheld electronic device 4.

While in the depicted exemplary embodiment the multiple-axis input device is the track ball 32, it is noted that multiple-axis input devices other than the track ball 32 can be employed without departing from the present concept. For instance, other appropriate multiple-axis input devices could include mechanical devices such as joysticks and the like and/or non-mechanical devices such as touch pads, track pads and the like and/or other devices which detect motion or input in other fashions, such as through the use of optical sensors or piezoelectric crystals. Likewise, in other exemplary embodiments, the keyboard 24 can be a virtual keyboard on the output apparatus 12.

The track ball 32 is freely rotatable in all directions with respect to the housing of the handheld electronic device 4. A rotation of the track ball 32 a predetermined rotational distance with respect to the housing provides an input to the processor apparatus 16, and such inputs can be employed by the routines 44, for example, as navigational inputs, scrolling inputs, selection inputs, and other inputs. The track ball 32 additionally is translatable toward the housing to provide additional inputs. The track ball 32 could be translated in such a fashion by, for example, a user applying an actuating force to the track ball 32 by pressing on the track ball 32. The inputs that are provided to the processor apparatus 16 as a result of a translation of the track ball 32 in the indicated fashion can be employed by the routines 44, for example, as selection inputs, delimiter inputs, or other inputs.

In accordance with the disclosed and claimed concept, the handheld electronic device 4 through cooperation between the routines 44 and the keyboard 24 advantageously enables text input in the Thai language using the Thai characters provided on the keys 28. In particular, in the exemplary embodiment, the handheld electronic device 4 may be toggled between a Roman character input mode, in which the Roman characters provided on the keys 28 may be selectively input through actuation of the keys in a conventional manner, and a Thai character input mode, in which the Thai characters provided on the keys 28 may be selectively input through actuation of the keys 28 in the manner described herein. Such toggling may be achieved by, for example, making an appropriate selection from a menu accessed through actuation of the menu key 33.

In the exemplary embodiment, when the handheld electronic device 4 is in the Thai character input mode, one or more Thai characters provided below the Roman character on each key 28 may be selected and input using a multi-tap scheme. Specifically, the first (left-most) Thai character provided below the Roman character on each key 28 may be selected and input by pressing the corresponding key 28 once, and the second (right-most) Thai character provided below the Roman character on each key 28 may be selected and input by pressing the corresponding key 28 twice within a predetermined time frame. Preferably, when the corresponding key 28 is pressed once, the first Thai character provided below the Roman character on the key 28 will be entered and displayed, and will be highlighted or underlined until the predetermined time frame elapses or until a different key 28 is pressed to indicate the possibility that the key 28 could be pressed again to get the second Thai character provided below the Roman character on the key 28. If the same key 28 is pressed twice with more than the predetermined time frame elapsing between each press, the first Thai character provided below the Roman character on the key 28 will input twice. The Thai character, if any, provided adjacent to the Roman character on each key 28 is provided on the SHIFT layer of the keyboard 24 and may be selected and input by pressing one of the <SHIFT> keys 35 and then pressing the key 28 having the desired Thai character.

Figure 4A:
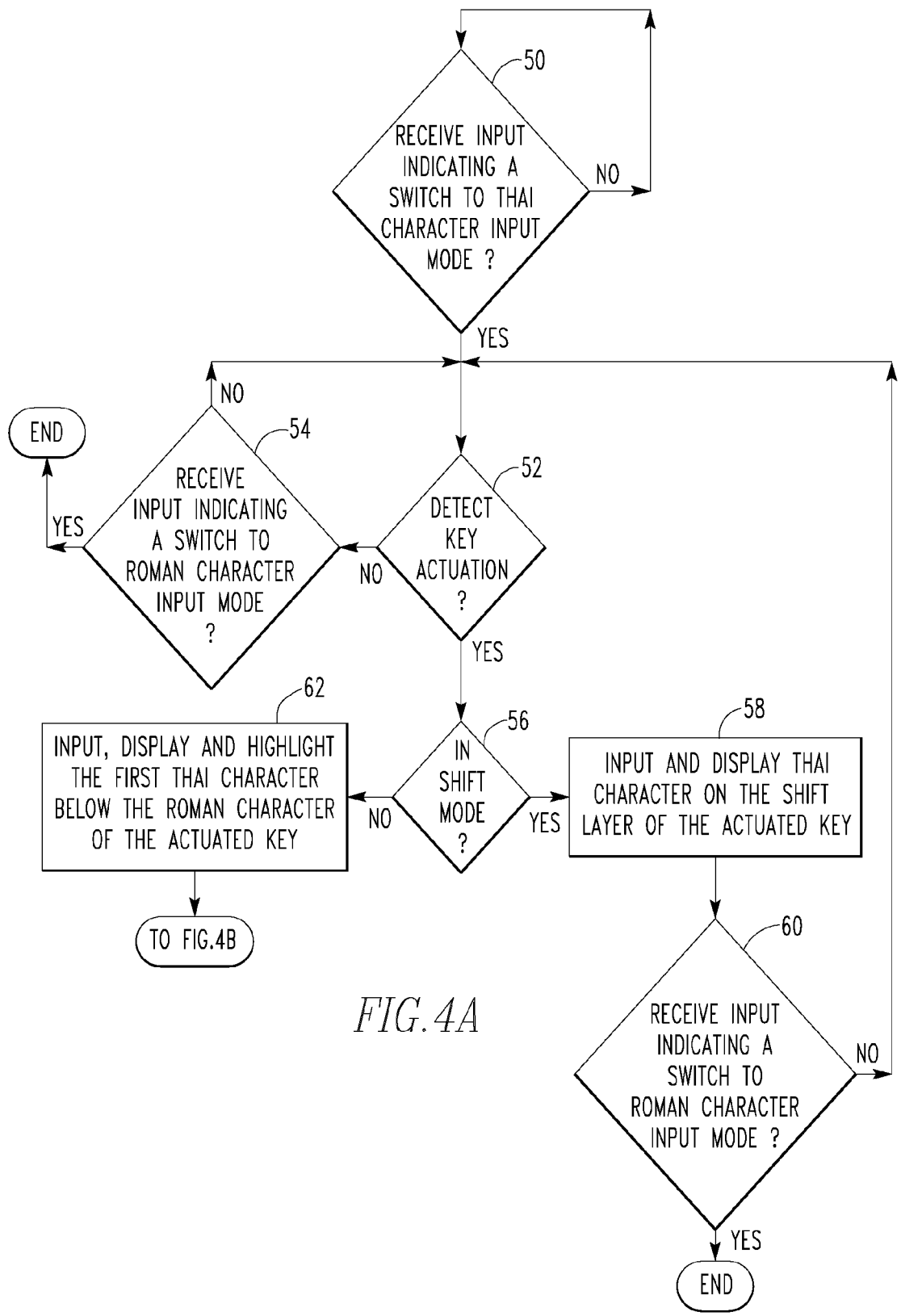
FIGS. 4A, 4B, 4C are flowcharts illustrating various aspects of a method for facilitating the entry of text having non-Roman characters using the exemplary handheld electronic device shown in FIG. 1 according to an embodiment of the disclosed and claimed concept.
Figure 4B:
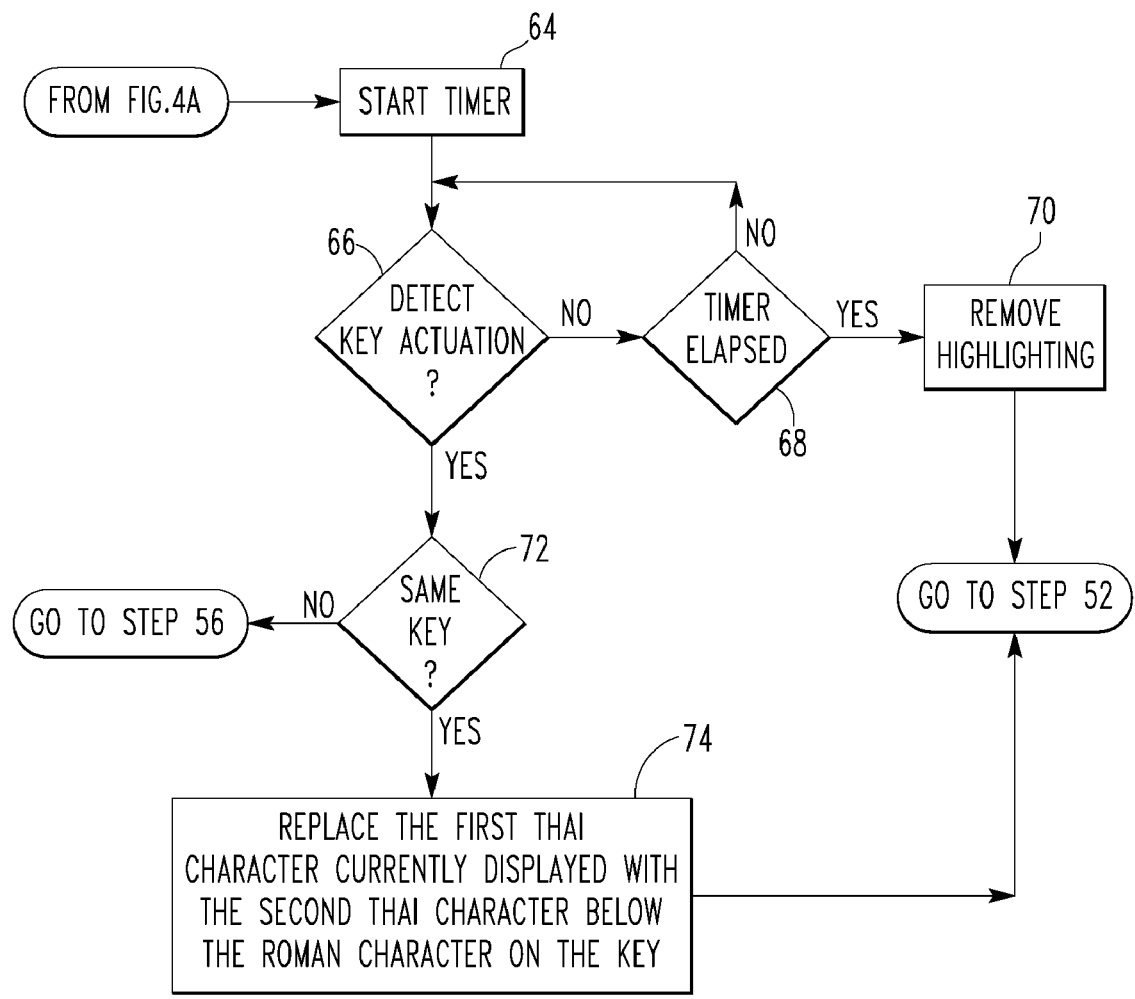

FIGS. 4A and 4B are flowcharts illustrating the method of entering Thai characters in the exemplary embodiment described above. Beginning at step 50, a determination is made as to whether the processor 36 has received an input indicating a switch to the Thai character input mode. If the answer is no, then the method returns to step 50. If, however, the answer is yes, then, at step 52, a determination is made as to whether an actuation of a key 28 has been detected. If the answer is no, then, at step 54, a determination is made as to whether the processor 36 has received an input indicating a switch to the Roman character input mode. If the answer is yes, then method ends. If the answer is no, then the method returns to step 52.

If the answer at step 52 is yes, meaning that an actuation of a key 28 has been detected, then, at step 56, a determination is made as to whether the processor 36 is currently in a shift mode. If the answer is yes, then, at step 58, the Thai character on the shift layer of the actuated key 28 is input and displayed on the output apparatus 12. Then, at step 60, a determination is made as to whether the processor 36 has received an input indicating a switch to the Roman character input mode. If the answer is yes, then the method ends. If, however, the answer is no, then the method returns to step 52.

If the answer at step 56 is no, meaning that the processor 36 is not currently in the shift mode, then at step 62, the first Thai character below the Roman character of the actuated key 28 is input into the processor 36 and displayed and highlighted on the output apparatus 12. The method then proceeds to FIG. 4B.

Referring to FIG. 4B, at step 64, a timer having a duration equal to the pre-determined timeframe for multi-tap entry described above is started. Next, at step 66, a determination is made as to whether the processor 36 has detected the actuation of one of the keys 28. If the answer is no, then, at step 68, a determination is made as to whether the timer has elapsed. If the answer is no, then the method returns to step 66. If the answer is yes, then, at step 70, the highlighting applied in step 62 is removed and the method returns to step 52 of FIG. 4A. If the answer at step 66 is yes, meaning that a key 28 has been actuated, then, at step 72, a determination is made as to whether it is the same key that was actuated in step 52. If the answer is no, then the method returns to step 56 in FIG. 4A. If the answer, however, at step 72 is yes, meaning that the same key 28 has been actuated, then, at step 74, the first Thai character currently displayed on the output apparatus 12 is replaced with the second Thai character below the Roman character on the key 28 that has been actuated (for the second time). Then, the method returns to step 52 of FIG. 4A.

Figure 3:
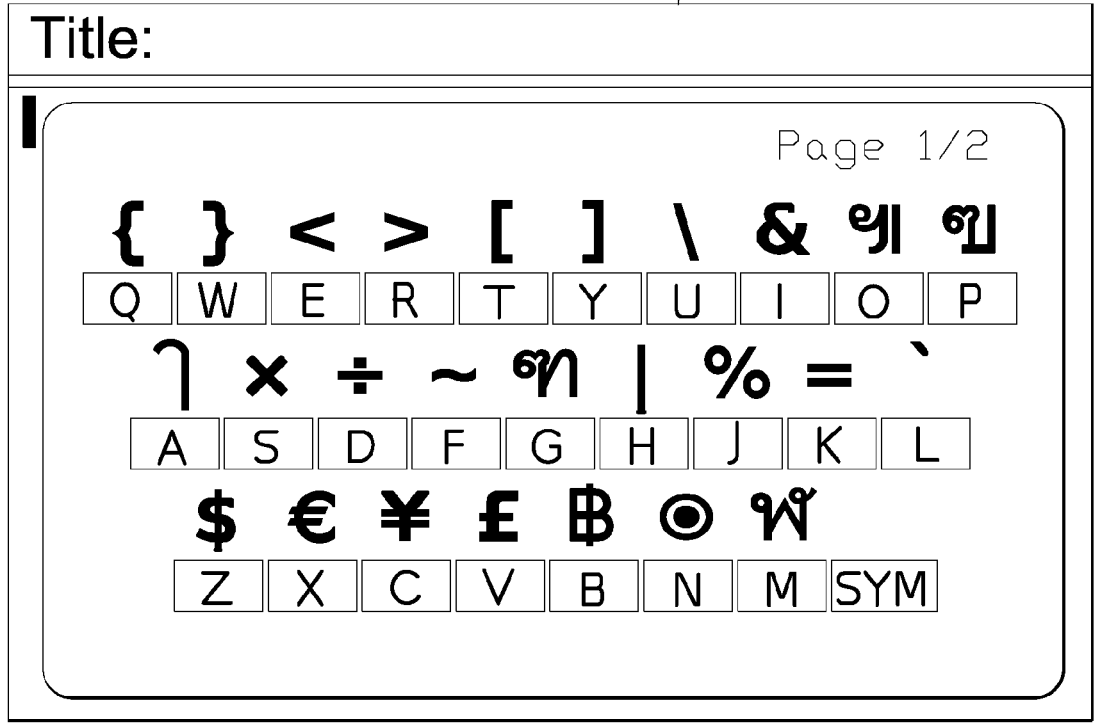
FIG. 3 is a schematic representation of a symbol screen of the exemplary handheld electronic device shown in FIG. 1.

In the exemplary embodiment, seldom used Thai characters are provided on a symbol screen 37 shown in FIG. 3 that may be accessed and displayed on the output apparatus 12 by pressing the <SYMBOL> key 37 of the keyboard 24. A desired Thai character may then be selected and input by pressing the key 28 shown to correspond to the desired Thai character on the symbol screen 37.

Moreover, Thai script is written left to right and consists of three levels, meaning that the individual characters may be positioned in one of three locations (levels): a base level, an above level (above the base level), and a below level (below the base level). The base level is where consonants, leading and following vowels, special characters and non-Thai characters are positioned. The above level is where above vowels, tones and above diacritics are positioned. The below level is where below vowels and below diactrics are positioned. In addition, the Thai language includes certain rules that prohibit certain character combinations, such as certain character appearing in sequence. For example, two "sara i" characters are not permitted to appear sequentially. In addition, "sara e" (เ), representing a leading vowel, cannot be followed by "sara a"(ะ), representing a following vowel, without at least a consonant between them. Certain following vowels may follow other following vowels, such as "sara o"(าะ). The Thai language also includes certain rules that prohibit word from starting with certain vowels. Those vowels include the "maiyamok" character, the "sara am" character, the "sara a" character, the "sara u" character, the "mai han-akat" character, the "sara ue" character, the "sara uu" character, the "sara ii" character, the "mai tho" character, the "mai ek" character, the "mai tri" character, the "sara aa" character, the "mai chattawa" character, the "sara i" character, the "sara uee" character, the "phintu" character, and the "thanthakhat" character. Other prohibitions are also possible either within the Thai language if applicable, or another language employing non-Roman characters, as appropriate. Thus, according to an aspect of the disclosed and claimed concept, the routines 44 that implement the method described herein prevent the user of the handheld electronic device 4 from entering illegal/non-permitted character sequences, and in certain circumstances will automatically input another character on the pressed key 28 that includes the non-permitted character in the place of the non-permitted character. In effect, by doing so, the routines in certain situations temporarily "convert" a multi-tap key into a single character key. It is noted that the foregoing input entry method routines 44 are not limited to Thai script, and can also be adapted for other languages to prevent the user from inputting a non-permissible sequence of characters.

Figure 4C:
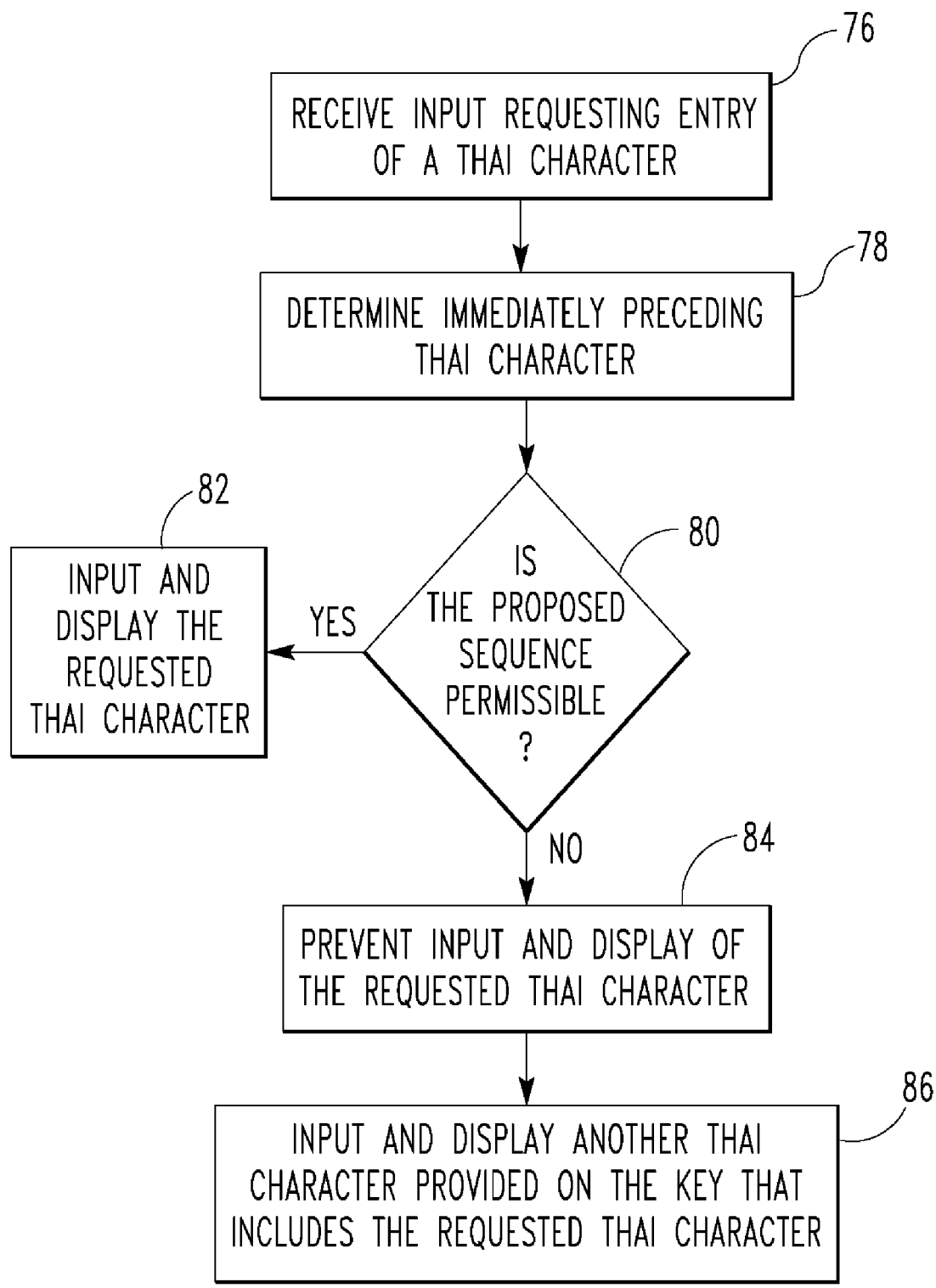

FIG. 4C is a flowchart illustrating the method just described. The method begins at step 76, wherein the processor 36 receives an input requesting the entry of a Thai character (this may be any of the key actuations described in connection with FIGS. 4A and 4B). Then, at step 78, the processor 36 determines the immediately preceding Thai character that was input and displayed. It should be noted that in step 78, in the case of a new word, the processor 36 will determine that there is no immediately preceding character (instead, the immediately preceding input will have been a space). Thus, the immediatly preceding character in the method of FIG. 4C may be "none." At step 80, a determination is made as to whether the proposed sequence is permissible based upon the applicable language rules as described above. If the answer is yes, then, at step 82, the requested Thai character is input and displayed on the output apparatus 12. If the answer at step 80 is no, then, at step 84, the processor 36 prevents the input and display of the requested Thai character. Then, at step 86, according to one particular embodiment of the disclosed and claimed concept, the processor 36 will then input and display on the output apparatus 12 another (different) Thai character provided on the key that includes the requested Thai character. An example of this type of automatic substitution is shown in connection with FIGS. 5 through 15. Step 86 may, alternatively, be omitted, in which case the processor 36 would simply prevent the input and display of the requested Thai character. In this embodiment, a message may be displayed to the user on the output apparatus 12 indicating that the proposed sequence is not permissible and instructing the user to make another character selection.

FIGS. 5-15 illustrate an example input sequence wherein the user types a greeting in Thai script by pressing certain of the keys 28 when the handheld electronic device 4 is in the Thai character input mode. Specifically, FIGS. 5-15 show a screen 40 displayed on the output apparatus 12 having a text portion 42 resulting from the pressing of a number of the keys 28 when the handheld electronic device 4 is in the Thai character input mode.

Figure 5:
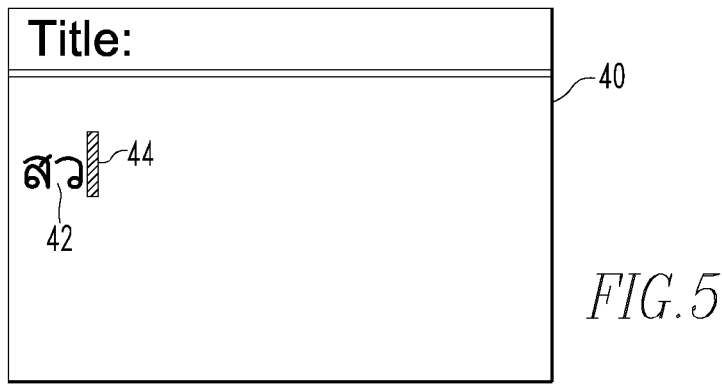
FIGS. 5-15 illustrate an example input sequence performed on the exemplary handheld electronic device shown in FIG. 1.
Figure 6:
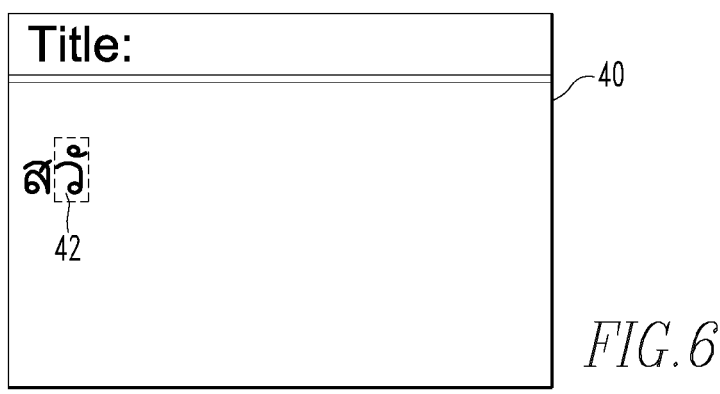
Figure 7:
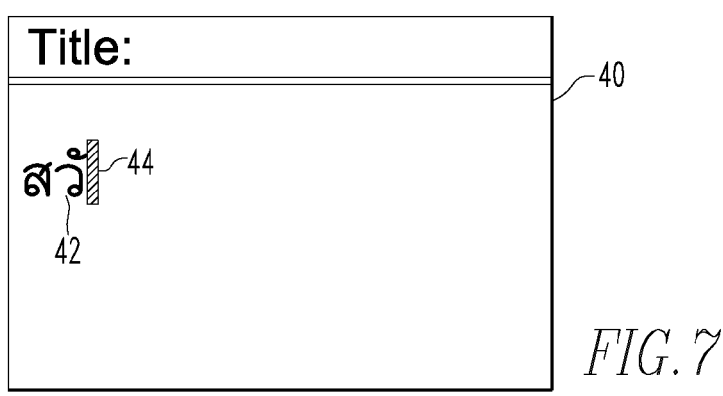

Referring to FIG. 5, the user in this example has initially pressed the <J> key 28 once and then pressed the <K> key 28 once. This results in the entry of the "so suea" character followed by the "wo waen" character, which are displayed in the text portion 42 as seen in FIG. 5. In addition, the predetermined time frame for multi-tap input described above has passed, and thus the "wo waen" character is not highlighted and the cursor 44 is positioned adjacent thereto. Next, referring to FIG. 6, the <T> key 28 is pressed once, which results in the entry of the "mai han-akat" character. The "mai han-akat" character is an above vowel, and thus, as seen in FIG. 6, it is positioned in the above level above the previous character (the "wo waen" character). In addition, in the case of FIG. 6, the predetermined time frame for multi-tap input described above has not yet passed, and thus the "wo waen" and "mai han-akat" characters are highlighted in the text portion 42, indicating that multi-tap entry is still available (to get the "sara ue" character which is the second Thai character appearing below the "T" on the <T> key 28). If the predetermined time frame for multi-tap input elapses without further input form the user or if the user presses the <SPACE> key 39, the "mai han-akat" character will be confirmed in the text portion 42 as shown in FIG. 7 and the cursor 44 will appear adjacent thereto.

Figure 8:
Figure 9:
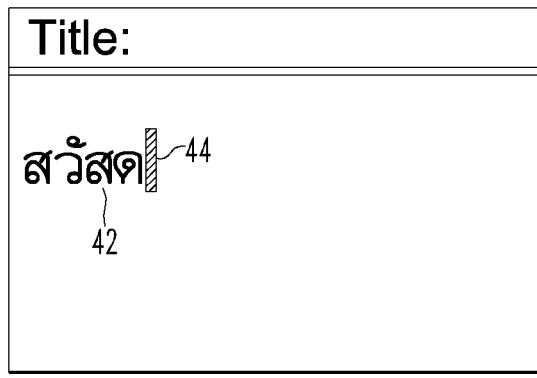
Figure 10:
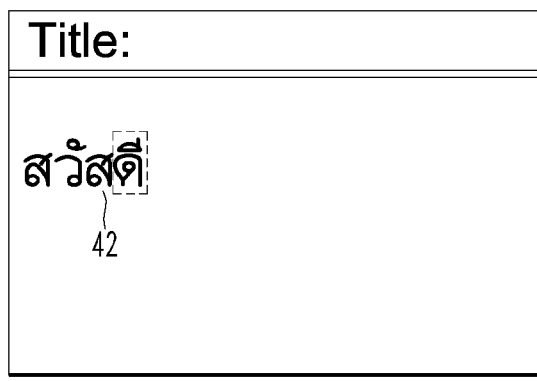
Figure 11:
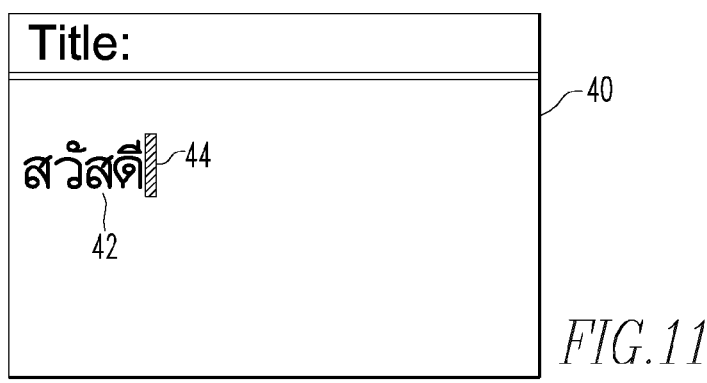
Figure 12:
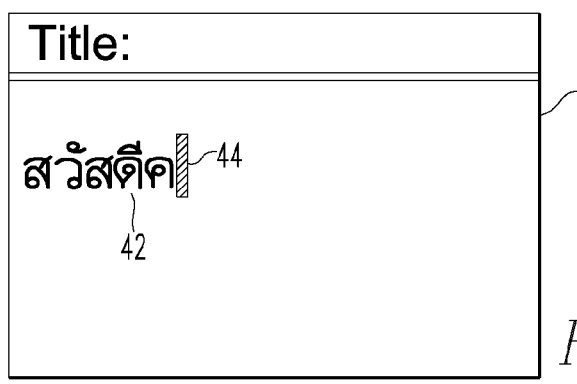
Figure 13:
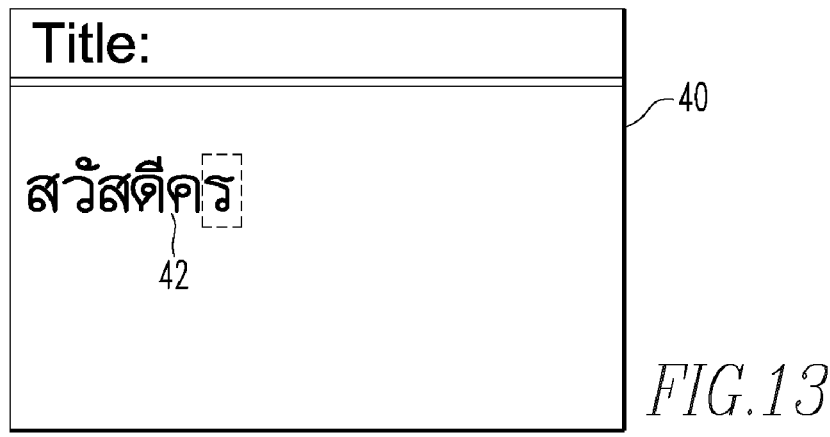
Figure 14:
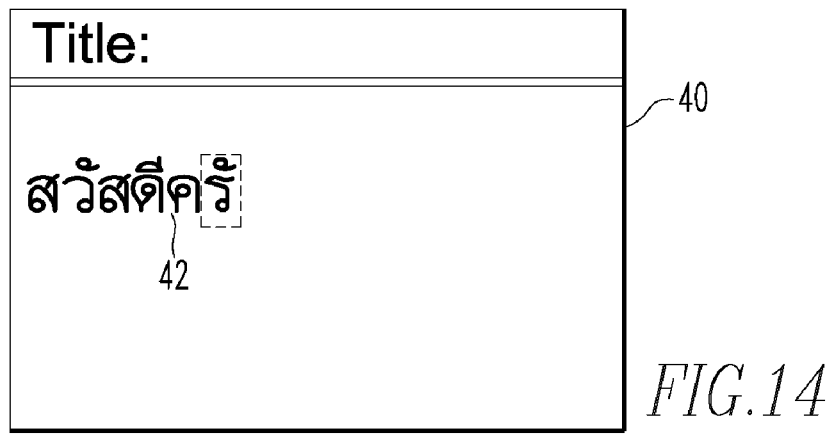
Figure 15:
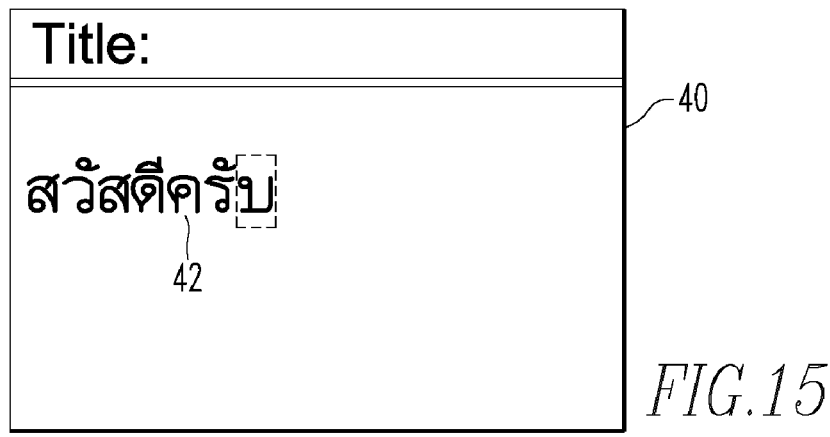

Next, referring to FIGS. 8 and 9, the user presses the <J> key 28 once and then the <S> key 28 once, which results in the entry of the "so suea" character followed by the "ko kai" character in the text portion 42 shown in FIG. 8. The user then, before the predetermined time frame for multi-tap input has elapsed, again presses the <S> key 28, which results in the "ko kai" character being replaced by the "do dek" character in the text portion 42 as shown in FIG. 9. The user then presses the <Y> key once, which results in the entry of the "sara i" character in the text portion 42 as shown in FIG. 10. The user then waits for the predetermined time frame for multi-tap input to elapse, which results in the text portion 42 shown in FIG. 11 (the cursor 44 is positioned adjacent to the last Thai character). The user then presses the <Y> key again with a single press. However, in Thai script, two sequential "sara i" characters are not permitted. As discussed elsewhere herein, the routines 44, according to an aspect of the disclosed and claimed concept, are programmed with the sequential character rules of Thai script. As a result, the routines 44 automatically cause the other character provided below the "Y" on the <Y> key 28, which is the "do dek" character, to be entered in the text portion 42 as shown in FIG. 12 instead of the "sara i" character. Finally, the user presses the <U> key 28 once followed by the <T> key 28 once followed by the <P> key 28 once, which results in the entry of the "ro ruea", "mai han-akat" and "bo baimai" characters, respectively, into the text portion 42 as shown in FIGS. 13-15 (each those characters is the first multi-tap choice on their respective keys 28).

Figure 16:
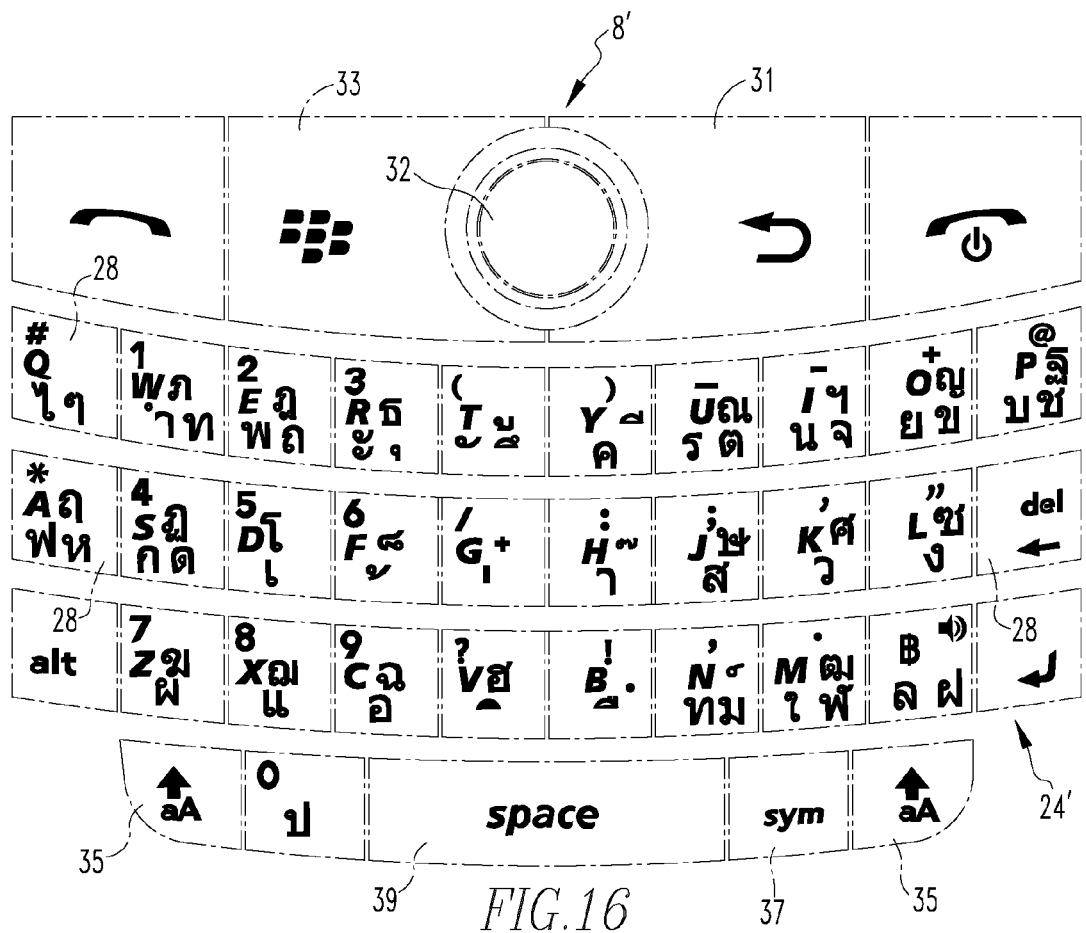
FIG. 16 is a schematic representation of an alternate embodiment of a keyboard forming a part of the exemplary handheld electronic device shown in FIG. 1.

FIG. 16 is a schematic representation of alternate embodiment of an input apparatus 8' having an alternative keyboard 24'. As seen in FIG. 16, keyboard 24' includes: a first key 28 having a Roman "Q" character, a Thai sara ai maimalai character and a Thai maiyamok character thereon; a second key 28 having a Roman "W" character, a Thai sara am character, a Thai tho nangmontho character, and a Thai pho samphao character thereon; a third key 28 having a Roman "E" character, a Thai pho phan character, a Thai tho thung character and a Thai do chada character thereon; a fourth key 28 having a Roman "R" character, a Thai sara a character, a Thai sara u character and a Thai tho thong character thereon; a fifth key 28 having a Roman "T" character, a Thai mai han-akat character, a Thai sara ue character and a Thai sara uu character thereon; a sixth key 28 having a Roman "Y" character, a Thai kho khwai character, and a Thai sara ii character thereon; a seventh key 28 having a Roman "U" character, a Thai ro rua character, a Thai to tao character and a Thai no nen character thereon; an eighth key 28 having a Roman "I" character, a Thai no nu character, a Thai cho chan character and a Thai paiyannoi character thereon; a ninth key 28 having a Roman "O" character, a Thai yo yak character, a Thai kho khai character and a Thai yo ying character thereon; a tenth key 28 having a Roman "P" character, a Thai bo baimai character, a Thai cho chang character and a Thai tho than character thereon; an eleventh key 28 having a Roman "A" character, a Thai fo fan character, a Thai ho hip character and a Thai ru character thereon; a twelfth key 28 having a Roman "S" character, a Thai ko kai character, a Thai do dek character and a Thai to patak character thereon; a thirteenth key 28 having a Roman "D" character, a Thai sara e character, and a Thai sara o character thereon; a fourteenth key 28 having a Roman "F" character, a Thai mai tho character, and a Thai maitaikhu character thereon; a fifteenth key 28 having a Roman "G" character, a Thai mai ek character, and a Thai mai chattawa character thereon; a sixteenth key 28 having a Roman "H" character, a Thai sara aa character, and a Thai mai tri character thereon; a seventeenth key 28 having a Roman "J" character, a Thai so sua character, and a Thai so rusi character thereon; an eighteenth key 28 having a Roman "K" character, a Thai wo waen character, and a Thai so sala character thereon; a nineteenth key 28 having a Roman "L" character, a Thai ngo ngu character, and a Thai so so character thereon; a twentieth key 28 having a Roman "Z" character, a Thai pho phung character, and a Thai kho rakhang character thereon; a twenty-first key 28 having a Roman "X" character, a Thai sara ae character, and a Thai cho choe character thereon; a twenty-second key 28 having a Roman "C" character, a Thai o ang character, and a Thai cho ching character thereon; a twenty-third key 28 having a Roman "V" character, a Thai sara i character, and a Thai ho nokhuk character thereon; a twenty-fourth key 28 having a Roman "B" character, a Thai sara uee character, and a Thai phintu character thereon; a twenty-fifth key 28 having a Roman "N" character, a Thai tho thahan character, a Thai mo ma character, and a Thai thanthakhat character thereon; a twenty-sixth key 28 having a Roman "M" character, a Thai sara ai maimuan character, a Thai lo chula character, and a Thai tho phuthao character thereon; a twenty-seventh key 28 having a Thai lo ling character, a Thai fo fa character and a Thai baht character thereon; and a twenty-eighth key 28 having a Thai po pla character thereon.

Thus, the disclosed and claimed concept provides a keyboard layout and a methodology that facilitates the entry of text in a language that employs non-Roman characters while at the same time still providing a standard QWERTY or similar keyboard adapted for the entry of text using Roman characters in a conventional manner.

While specific embodiments of the disclosed and claimed concept have been described in detail, it will be appreciated by those skilled in the art that various modifications and alternatives to those details could be developed in light of the overall teachings of the disclosure. For example, while a physical keyboard 24 is described herein, it will be appreciated that the disclosed and claimed concept may be implemented in the form of virtual keyboard provided on a touch screen. Accordingly, the particular arrangements disclosed are meant to be illustrative only and not limiting as to the scope of the disclosed and claimed concept which is to be given the full breadth of the claims appended and any and all equivalents thereof.

What is claimed is:
1. A handheld electronic device comprising:
   a processor apparatus comprising a processor and a memory;
   an input apparatus comprising a plurality of input members and being structured to provide input to the processor apparatus, a first set of the input members each having one or more non-Roman characters assigned thereto, said non-Roman characters being employed in a first language, said first language having one or more rules which govern permissible character sequences in the first language;
   an output apparatus structured to receive output signals from the processor apparatus;
   the memory having stored therein a number of routines which, when executed on the processor, cause the processor to:
      in response to an actuation of a first one of the input members display on said output apparatus a first one of the non-Roman characters that is assigned to the first one of the input members; and based on said one or more rules which govern permissible character sequences in the first language, prevent display on said output apparatus of a second one of the non-Roman characters in response to an actuation of a second one of the input members having the second one of the non-Roman characters assigned thereto immediately following said actuation of said first one of the input members.

2. The handheld electronic device according to claim 1, wherein said first set of the input members each also have a Roman character assigned thereto.

3. The handheld electronic device according to claim 1, wherein said first one of the input members and said second one of the input members are the same input member.

4. The handheld electronic device according to claim 1, wherein said first one of the non-Roman characters and said second one of the non-Roman characters are the same non-Roman character.

5. The handheld electronic device according to claim 1, wherein said routines, when executed on the processor, further cause the processor to display a third one of the non-Roman characters provided on said second one of the input members and different than said second one of the non-Roman characters in response to said actuation of said second one of the input members.

6. The handheld electronic device according to claim 1, wherein each said non-Roman character is a Thai character.

7. A handheld electronic device comprising:
a processor apparatus comprising a processor and a memory;
an input apparatus comprising a plurality of input members and being structured to provide input to the processor apparatus, a first set of the input members each having a Roman character assigned thereto, at least some of the input members in the first set of the input members having a first non-Roman character and a second non-Roman character assigned thereto;
an output apparatus structured to receive output signals from the processor apparatus;
the memory having stored therein a number of routines which, when executed on the processor, cause the handheld electronic device to be selectively switchable between: (i) a Roman character input mode, and (ii) a non-Roman character input mode, wherein in said Roman character input mode, each said Roman character may be selected and input into said processor apparatus for display on said output apparatus in response to actuation of the input member to which it is assigned, and wherein in said non-Roman character input mode, each first non-Roman character may be selected and input into said processor apparatus for display on said output apparatus in response to a first type of actuation of the input member to which it is assigned, and each second non-Roman character may be selected and input into said processor apparatus for display on said output apparatus in response to a second type of actuation of the input member to which it is assigned;
wherein said non-Roman characters are employed in a first language, said first language having one or more rules which govern permissible character sequences in the first language, said routines, when executed on the processor, further cause the processor to:
in response to an actuation of a first one of the input members display on said output apparatus a first one of the non-Roman characters that is assigned to the first one of the input members; and
based on said one or more rules which govern permissible character sequences in the first language, prevent display on said output apparatus of a second one of the non-Roman characters in response to an actuation of a second one of the input members having the second one of the non-Roman characters assigned thereto immediately following said actuation of said first one of the input members.

8. The handheld electronic device according to claim 7, wherein said routines, when executed on the processor, further cause the processor to display a third one of the non-Roman characters provided on said second one of the input members and different than said second one of the non-Roman characters in response to said actuation of said second one of the input members.

9. The handheld electronic device according to claim 7, wherein said first type of actuation comprises a single actuation of the input member and said second type of actuation comprises a first actuation of the input member followed by a second actuation of the input member within a predetermined time frame.

10. The handheld electronic device according to claim 7, wherein said handheld electronic device includes a shift mode for said input apparatus which causes a particular linguistic element to be input when each input is actuated, and wherein one of said first type of actuation and said second type of actuation comprises a single actuation of the input member when said handheld electronic device is in said shift mode.

11. The handheld electronic device according to claim 7, wherein each said first non-Roman character and said second non-Roman character is a Thai character.

* * * * *